United States Patent [19]
Gara

[11] 4,140,397
[45] Feb. 20, 1979

[54] METHOD FOR SENSING THE PATTERN SIDE OF MICROCIRCUIT CHIPS

[75] Inventor: Aaron D. Gara, Rochester, Mich.

[73] Assignee: General Motors Corporation, Detroit, Mich.

[21] Appl. No.: 796,125

[22] Filed: May 12, 1977

[51] Int. Cl.² .................. G01B 11/30; G01N 21/48
[52] U.S. Cl. ............................. 356/394; 250/561; 356/354; 356/448
[58] Field of Search .................. 356/71, 109–111, 356/120, 210–212; 250/550, 556–557, 561; 350/81

[56] References Cited
U.S. PATENT DOCUMENTS

| | | | |
|---|---|---|---|
| 3,229,564 | 1/1966 | Meltzer | 356/210 |
| 3,597,045 | 8/1971 | Mathisen | 350/162 SF |
| 3,957,376 | 5/1976 | Charsky et al. | 356/106 R |

OTHER PUBLICATIONS

Ikeda et al., "Ceramic Surface Inspection Using Laser Technique" Japanese Jr. of App. Physics vol. 14, Suppl. 14–1 pp. 487–192, 1975.

Lendaris et al., "Diffraction-Pattern Sampling for Automatic Pattern Recognition", Proc. IEEE vol. 58 #2, 2–1970, pp. 198–216.

*Primary Examiner*—John K. Corbin
*Assistant Examiner*—Wm. H. Punter
*Attorney, Agent, or Firm*—Warren D. Hill

[57] ABSTRACT

A collimated beam of light is directed onto a face of a microcircuit chip. If the configuration side of the chip is up and if the chip has a typical pattern predominantly comprised of two orthogonal sets of lines, the light reflected from the chip will be formed in a cross shaped diffraction pattern with most of the light concentrated in the center of the cross. If, however, the chip is upside down so that a plain face is exposed to the light, the light will be reflected fairly uniformly from the chip. By measuring the reflected light in a small center zone as well as in a larger zone and the light measurements are compared, it can be determined whether the diffraction pattern is present thereby revealing whether the chip is right side up, i.e. configuration side up.

2 Claims, 3 Drawing Figures

METHOD FOR SENSING THE PATTERN SIDE OF MICROCIRCUIT CHIPS

This invention relates to a method of determining whether a microcircuit chip is configuration side up and particularly to such a method which can be carried out automatically bases on optical properties of the chip.

It is desirable in the processing of electrical components to handle microcircuit chips automatically. One task in such a handling process is to determine without human inspection whether microcircuit chips on a conveyor or other support are right side up, that is configuration side up, so that the right side up chips can be sorted from those that are upside down.

It is therefore an object of this invention to provide an optical method of determining whether a microcircuit chip is configuration side up.

A further object is to provide such a method which avoids the necessity of human inspection for sorting chips and provides an electrical output for each chip found to have circuit side up.

The invention is carried out by projecting a collimated light beam onto the surface of a chip such that if the chip is microcircuit side up the light reflected therefrom will be in a characteristic diffraction pattern, analyzing the light reflected from the chip to detect such a diffraction pattern by measuring the light from the small central area of the reflected light and measuring the light reflected over a large central area, and comparing the two measurements to determine whether a diffraction pattern is present and therefore whether the configuration side of the microcircuit chip is up.

The above and other advantages will be made more apparent from the following specification taken in conjunction with the accompanying drawings wherein like reference numerals refer to like parts and wherein.

Figure 1:
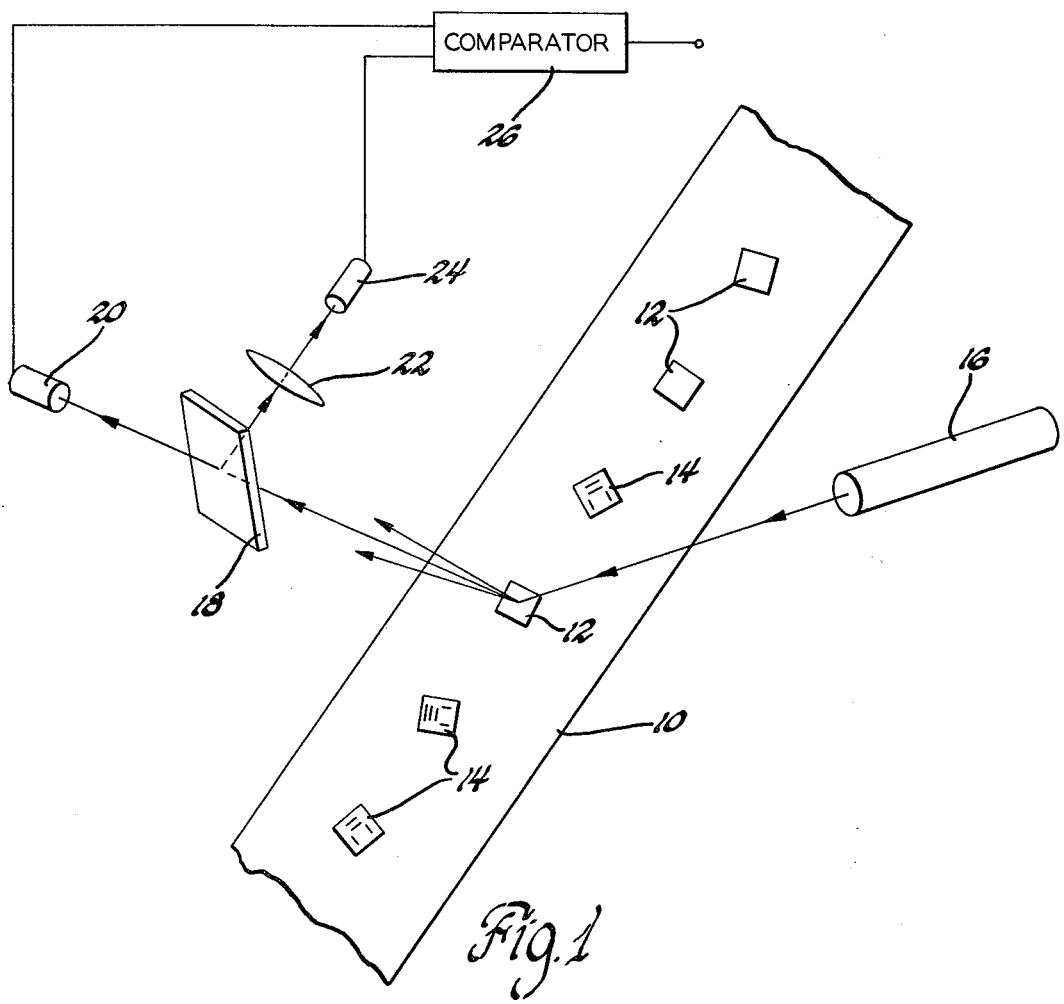
FIG. 1 is a diagrammatic illustration of an optical and electrical system for detecting right side up microcircuit chips according to the invention.

Referring to FIG. 1, a conveyor or other support 10 carries a plurality of microcircuit chips 12 which are upside down as well as chips 14 which have their configuration side facing up, that is, the electronic structure visible from the upper face of each chip 14 is formed in a pattern which typically comprises predominant orthogonal sets of parallel lines. The upside down chips 12, however, are plain, lacking significant pattern features. The chips are arranged along the center of the conveyor although they need not be in any predetermined angular orientation. A source of collimated light, preferably a laser 16, is directed to the center of the conveyor 10 to illuminate each chip 12, 14 one at a time. The beam of light need not illuminate the entire chip surface, however. The illumination of $\frac{1}{4}$ to $\frac{1}{2}$ of the chip surface is generally sufficient to cover the line detail of the chip even if the microcircuit pattern is broad. Where the chips have a high resolution line pattern, a smaller portion of the chip area may be illuminated to obtain adequate results. The light reflected from the chip near the angle of specular reflection is analyzed to determine the presence of a far field diffraction pattern. A beam splitter 18 passes a portion of the reflected light in one path to a photodetector 20 which collects the light reflected from a small central area of the reflected light. A collection lens 22 intercepts light emitter in a second path from a beam splitter 18 to collect light from a large area concentric with the above small central area of the reflected light pattern and focuses that light onto a second photodetector 24. The photodetector outputs are compared by an electronic comparator 26 which produces one output when a diffraction pattern is reflected from a microcircuit chip being inspected and another output in the absence of a diffraction pattern. The photodetectors produce D.C. output signals proportional to the radiant flux imposed thereon. The comparator 26 is of the type utilizing an operational amplifier which responds to the D.C. signals from the photodetectors.

Figure 2:
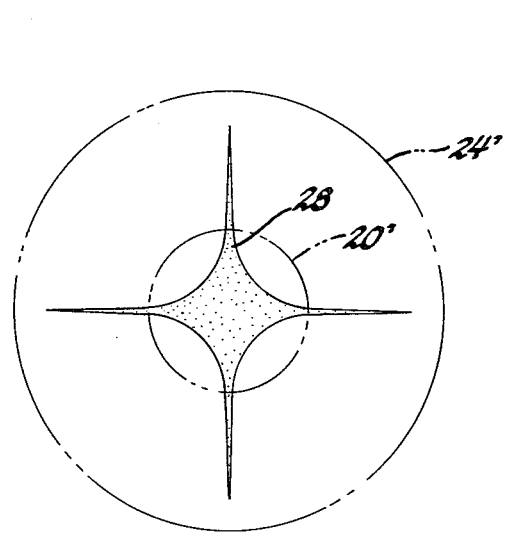
FIG. 2 is an illustration of a diffraction pattern from a typical microcircuit with an indication of the light measuring zones used in carrying out the method of the invention.

As shown in FIG. 2, the far field diffraction pattern reflected from a typical microcircuit chip 14 having its pattern side exposed to the illumination is a characteristic cross shaped pattern 28 having most of its light concentrated in the center of the diffraction pattern which corresponds to the angle of specular reflection from the plane of the chip. The circuit 20' imposed on the diffraction pattern 28 illustrates the portion of the diffraction pattern sensed by the photodetector 20 whereas a circle 24' illustrate the area of the diffraction pattern sensed by the photodetector 24. Since the center of the cross shaped pattern 28 includes most of the light in the diffraction pattern, the radiant flux sensed by photodetector 24 will be only slightly greater than that sensed by detector 20. The zone between the circles 24' and 20' contributes only a very small part of the total light sensed by the photodetector 24. Thus the photodetector outputs are nearly equal when the diffraction pattern is present and the comparator 26 senses that substantial equality to provide an output indicative of the presence of the diffraction pattern and therefore the presence of a chip with its configuration side up.

Figure 3:
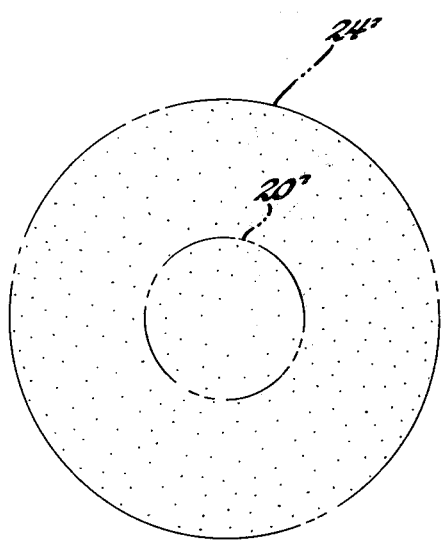
FIG. 3 is an illustration of the light measuring zones of FIG. 2 wherein the zones are uniformly illuminated.

When, however, a chip 12 is upside down and its plain surface is turned up or indeed if there is no chip present on the carrier at the site illuminated by the laser, a diffused uniform reflection pattern will be emitted from the chip surface or the carrier. Thus as shown in FIG. 3, the areas within the circles 20' and 24' are substantially uniformly illuminated so that because of its larger collection area, the detector 24 will produce a very much larger output signal than detector 20. That imbalance will be sensed by the comparator 26 to provide an output signal distinctly different from that which indicates the presence of the diffraction pattern.

An example of specific apparatus geometry follows for inspection of a microcircuit chip of 2mm per side and which contains circuit detail characterized by a dominant line pattern of 10 lines per millimeter. Such a pattern simulates a diffraction grating having a first order diffraction pattern of one-third degree. The center photodetector 20 is proportioned to subtend a planar angle of 1° and will collect most of the radiant flux in a diffraction pattern. The collection lens 22 subtend a planar angle of 6° to illuminate the photodetector 24 which therefore collects slightly more radiant flux from the diffraction pattern. When, however, the plain side of the chip scatters light uniformly, the photdetector 24 will collect about 36 times as much radiant flux as the photodetector 20.

It will thus be seen that by comparing the center of the far field light reflection pattern from a microcircuit chip with a larger concentric area, the presence of a diffraction pattern can be positively determined and the diffraction pattern in turn indicates the presence of a microcircuit chip with its configuration pattern exposed to the beam of illuminating light. Thus the method of this invention provides a simple inexpensive way of electrically signalling the presence of a microcircuit chip placed right side up on a support.

The embodiments of the invention in which an exclusive property or privilege is claimed are defined as follows:

1. The method of determining whether a microcircuit chip is configuration side up where the chip has said configuration on one side which relfects light in a characteristic cross-shaped diffraction pattern and the other side reflects light in a relatively uniform pattern, comprising the steps of
    reflecting light from the chip by illuminating at least a portion of the upper surface of the chip with collimated light,
    measuring the reflected light at a small central portion of the reflected light pattern to obtain a first value of radiant flux,
    measuring the light reflected from the surface over a relatively large portion of the reflected light pattern to obtain a second value of radiant flux, and
    comparing the first and second values to obtain a value indicative of the configuration on the upper surface of the chip independently of variations in the surface reflectivity of chips and variations in brightness of the collimated light.

2. The method of determining whether a microcircuit chip is configuration side up where the chip has said configuration on one side which reflects light in a characteristic cross-shaped diffraction pattern wherein nearly all the reflected light is concentrated in a small central zone in the diffraction pattern and relatively little light is in an outer zone surrounding the central zone, and the other side of the chip reflects light relatively uniformly throughout both of said zones, comprising the steps of
    reflecting light from the chip by illuminating at least a portion of the upper surface of the chip with collimated light,
    collecting a first representative portion of the reflected light in the said central zone and measuring the first collected portion to obtain a first light value,
    collecting a second representative portion of the reflected light in the combined central and outer zones and measuring the said second collected portion to obtain a second light value,
    comparing the first and second light values to obtain a value indicative of the configuration on the upper surface of the chip whereby the said values are nearly the same when the said cross-shaped diffraction pattern is present and the values are substantially different when the zones are uniformly illuminated, the relative light value being independent of variations in the surface reflectivity of chips and variations in brightness of the collimated light.

* * * * *